United States Patent [19]

Norton

[11] Patent Number: 4,844,396
[45] Date of Patent: Jul. 4, 1989

[54] STRAP ON PIPE MOUNTING

[75] Inventor: Gary N. Norton, Tulsa, Okla.
[73] Assignee: Badger Meter, Inc., Milwaukee, Wis.
[21] Appl. No.: 16,935
[22] Filed: Feb. 20, 1987
[51] Int. Cl.⁴ ............................................. A47B 96/06
[52] U.S. Cl. .................................. 248/231; 248/218.4
[58] Field of Search ...................... 248/230, 231, 218.4, 248/219.4, 219.3, 74.3

[56] References Cited

U.S. PATENT DOCUMENTS

| | | | |
|---|---|---|---|
| 575,857 | 1/1897 | Sly | 248/231 |
| 1,819,768 | 8/1931 | Coffing | 248/231 X |
| 1,836,878 | 12/1931 | Saver | 248/231 X |
| 2,693,015 | 11/1954 | Richards et al. | 248/218.4 X |
| 2,747,820 | 5/1956 | Blu | 248/231 X |
| 3,241,800 | 3/1966 | Richter, III | 248/231 X |
| 3,539,138 | 11/1970 | Desroches | 248/231 |

Primary Examiner—Alvin C. Chin-Shue
Assistant Examiner—David L. Talbott
Attorney, Agent, or Firm—Quarles & Brady

[57] ABSTRACT

A mounting assembly for an ultrasonic flow sensor or other object includes a bracket which is mounted to the sides of the sensor and which has flexible legs extending away from the sensor. A strap formed of chain and one or more extension springs is connected at its ends to the bracket on opposite sides of the sensor. The strap encircles the pipe or other conduit on which the sensor is to be mounted. The flexible legs mount pads on their ends which contact and conform with the outer surface of the conduit. The length of the strap can be adjusted by one or more turnbuckle arrangements.

15 Claims, 2 Drawing Sheets

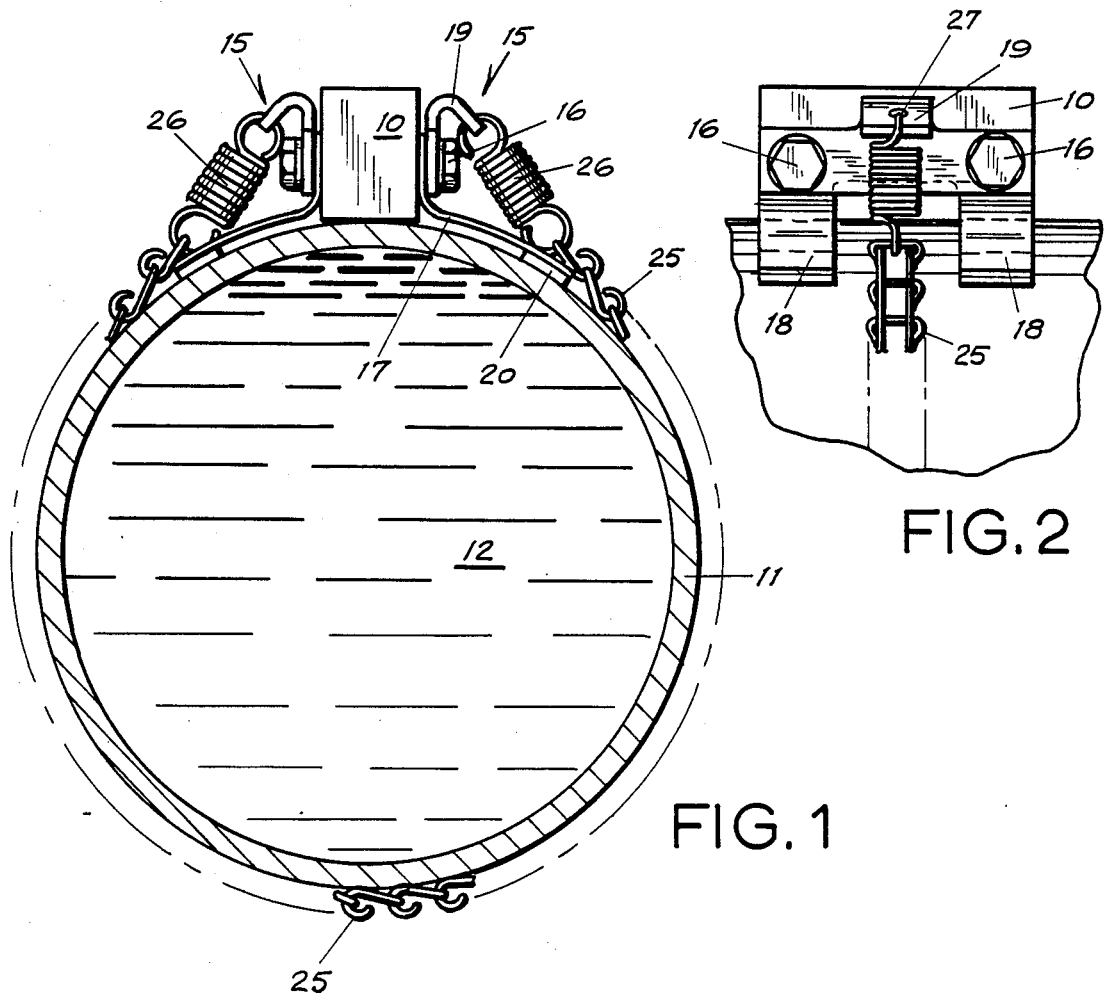
FIG. 2
FIG. 1
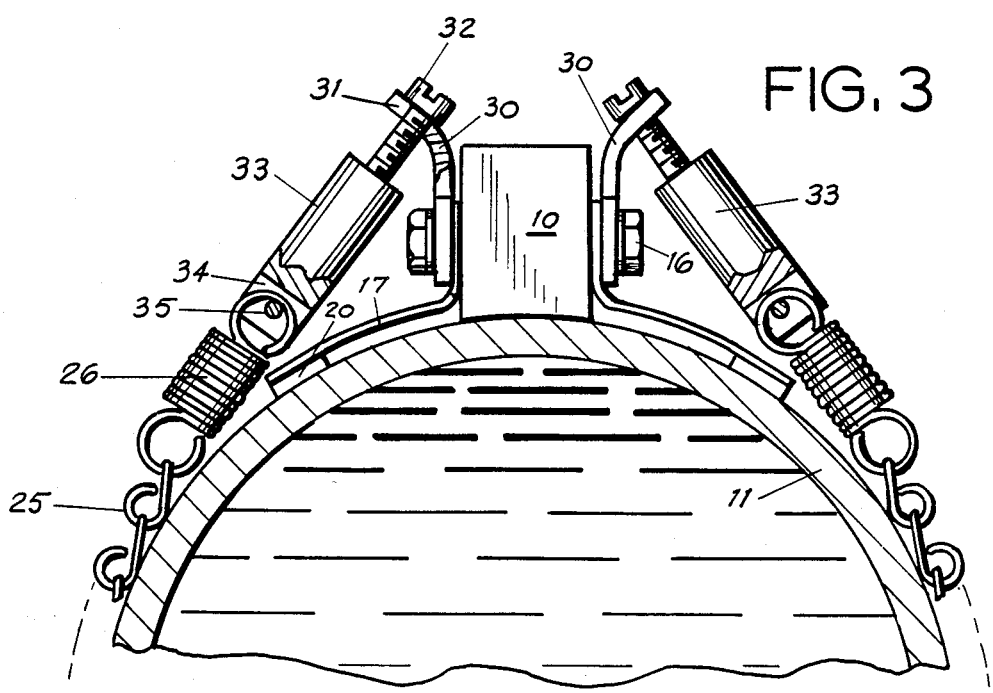
FIG. 3

STRAP ON PIPE MOUNTING

BACKGROUND OF THE INVENTION

This invention relates to an assembly for mounting objects on pipes or other conduits, and particularly to a strap-on mounting for a fluid flow sensor.

Fluid flow in pipes and other conduits is often measured by means of ultrasonic transducers (sensors) mounted on the surface of the pipe. Such sensors transmit and receive ultrasonic signals through the pipe and the contents flowing through the pipe. An example of such an ultrasonic flowmeter is found in U.S. Pat. No. 3,953,735 issued Feb. 3, 1976 to Bock W. Lee for "Ultrasonic Flowmeter". As shown in that patent, more than one sensor may be mounted on the surface of the pipe with the sensors displaced from each other along the length of the pipe.

In such ultrasonic flowmeters it is very important that there be good contact between the sensor and the outer surface of the pipe or other conduit. The mounting should also not introduce another media through which the ultrasonic signals must be transmitted or received.

The present manner of mounting sensors to the pipe surfaces involves the use of castings that hold the sensor and are bolted in place. The castings are machined to fit the particular pipe upon which they are to be mounted. This approach is very costly, both because of the nature of the components used and because each mounting must be tailored to the particular pipe to which it will be attached.

SUMMARY OF THE INVENTION

The invention involves an assembly for mounting an object, such as a probe or sensor, upon the exterior surface of a pipe or other conduit. The assembly includes bracket means mounted on the object with legs that extend away from opposite sides of the object to contact the surface of the conduit. A flexible and stretchable strap means extends around the conduit and is anchored at each of its ends to a respective one of the brackets.

In the preferred embodiments, the strap means comprises a flexible chain and at least one coiled extension spring. There may be a spring at each end of the chain or a pair of chain portions joined at the middle by a spring. In any case, the point of attachment of the strap means to the bracket means is at a level substantially above the level of the legs.

The mounting assembly may also include means for shortening the length of the strap means while the strap means is attached to the bracket means. In one embodiment, the shortening means comprises turnbuckles attached between the ends of the strap means and the bracket means. In another embodiment, the shortening means is a part of the bracket means.

Also in accordance with the preferred embodiments, the legs mount friction pads that engage the surface of the conduit and the pads are formed of a hard rubber or other elastomer. The legs are preferably resilient so that they will conform to the shape and size of a variety of conduits.

It is a principal object of the invention to provide an assembly for mounting an object, such as a probe or sensor, on a pipe or other conduit and which will hold the object in contact with the pipe and prevent longitudinal or circumferential movement.

It is another object of the invention to provide such an assembly which is simple in construction and operation.

It is yet another object of the invention to provide such an assembly which is readily adaptable for mounting an object on a wide variety of shapes and sizes of pipes and other conduits.

The foregoing and other objects and advantages of the invention will appear in the following detailed description. In the description, reference is made to the accompanying drawing which illustrates preferred embodiments of the invention.

BRIEF DESCRIPTION OF THE DRAWINGS

FIG. 1 is a view in front elevation of a mounting assembly in accordance with the invention shown mounted on a pipe;

FIG. 2 is a partial view in side elevation of the mounting assembly of FIG. 1;

FIG. 3 is a partial view in front elevation of a second embodiment of the mounting assembly;

DETAILED DESCRIPTION OF THE PREFERRED EMBODIMENTS

Figure 4:
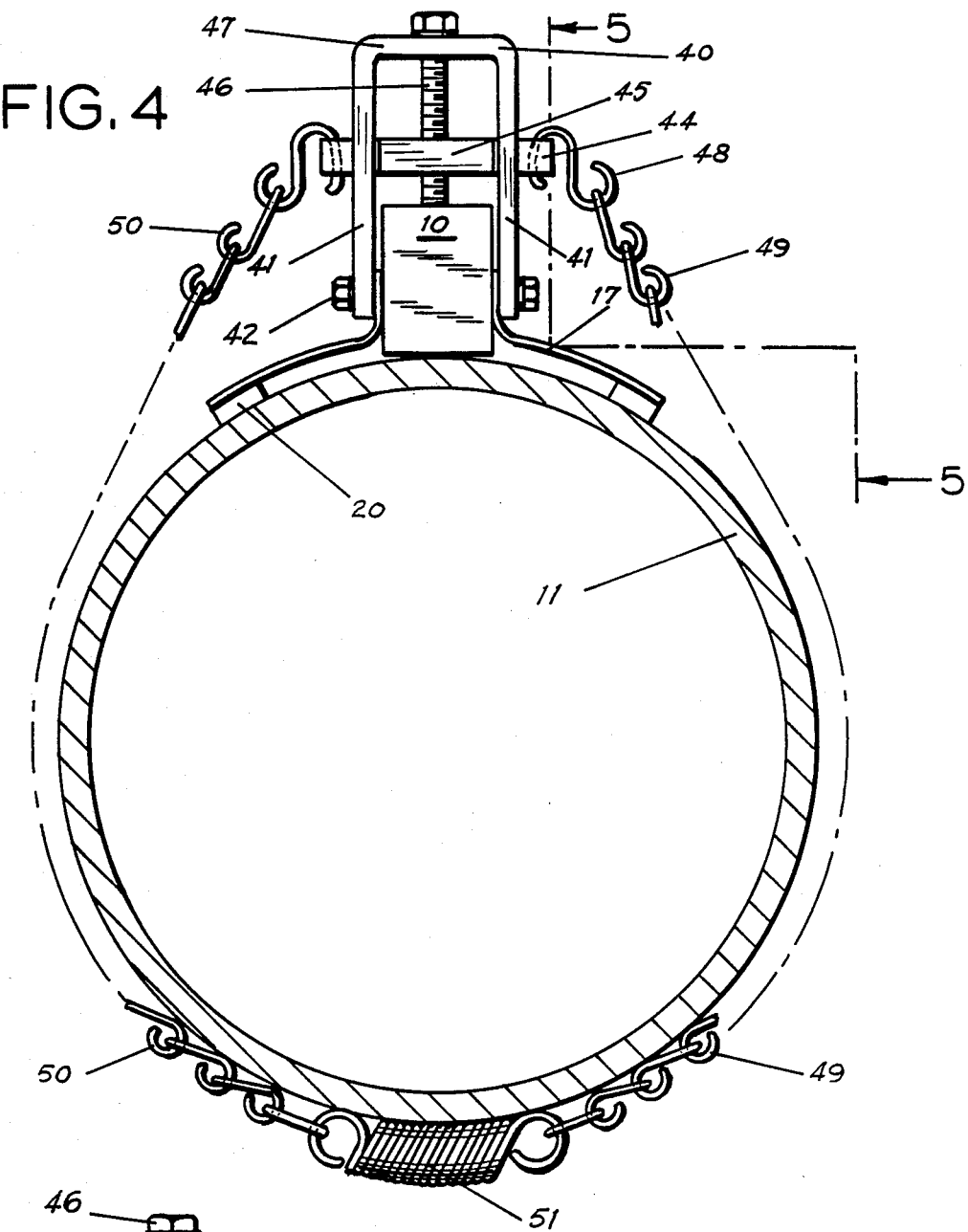
FIG. 4 is a view in front elevation of a third embodiment of the mounting assembly.

Referring to FIGS. 1 and 2, a sensor block 10 is shown mounted to the outer surface of a pipe 11 through which a fluid 12 will flow. The sensor block 10 can be of any known construction, and the construction and operation of such sensor blocks form no part of the present invention. A pair of identical bracket assemblies 15 are mounted by bolts 16 to opposite sides of the sensor block 10. Each assembly 15 consists of two parts; a resilient leg portion 17 having a pair of spaced, elongated legs 18, and an upper rigid anchor portion 19. The leg portion 17 and anchor portion 19 each include central bodies having openings (not shown) through which the bolts 16 pass to hold the leg portion 17 and the anchor portion 19 together and to mount the assembly 15 to the sensor body 10.

The leg bracket 17 is preferably formed of a spring steel material so that it will readily adjust itself to conform to the perimeter of the pipe 11 and will accommodate pipes of any diameter. Each leg 18 is provided with a friction pad 20 near the end of the leg and the friction pads 20 are in contact with the outer perimeter of the pipe. The pads 20 are preferably formed of a hard rubber or other elastomer so that they tend to grip the surface of the pipe.

A flexible and elastic strap assembly surrounds the pipe 11 and is anchored at its ends to the anchor brackets 19. The strap assembly includes a flexible chain 25, which is preferably in the form of a ladder sprocket chain, and a pair of coil extension springs 26. A link of the chain 25 is connected to one end of each spring 26 and the other end of each spring 26 is attached to an opening 27 in a respective anchor portion 19 of the bracket assembly 15.

The anchor points for the ends of the strap assembly are substantially above the level of the legs 18 and therefore above the perimeter of the pipe. The result is that a large component of force is exerted normal to the surface of the pipe. Such force will urge the sensor block 10 into intimate contact with the surface of the pipe 11. The force exerted by the elasticity of the strap assembly, the spring force of the legs 18 and frictional force between the pads 19 and the surface of the pipe 11 all combine to hold the sensor probe 10 at a particular position on the pipe 11. The mounting resists any tendency of the sensor block 10 to move either circumferentially or longitudinally along the pipe 11. The mounting also accommodates expansion and contraction due to temperature changes.

The mounting assembly can accommodate any size and shape of pipe or other conduit by reason of the use of the resilient legs 18 and the use of a simple chain 25 which can be provided in any length.

In the second embodiment of FIG. 3, a modified anchor portion 30 is employed for each bracket assembly. The modified anchor portion has an end with a slot 31 that receives the bolt 32 of a turnbuckle 33. The other end of the turnbuckles 33 have a longitudinal slot 34 with a transverse pin 35 to which is attached the anchoring end of the extension spring 26. The arrangement of FIG. 3 allows assembly of the mounting mechanism about a pipe in a generally relaxed state and the subsequent tightening of the strap assembly by shortening the turnbuckles 33.

Figure 5:
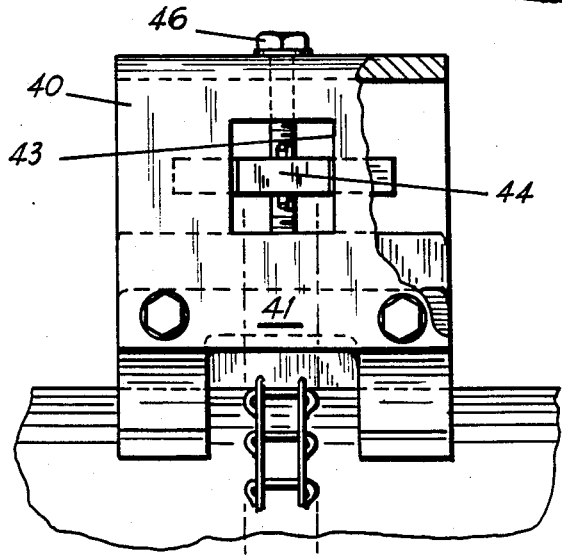
FIG. 5 is a partial view in side elevation of the third embodiment of FIG. 4.

In the third embodiment of FIGS. 4 and 5, a single length adjustment is provided instead of the two turnbuckles of the second embodiment. A single coil extension spring is also used. Specifically, the pairs of anchor brackets 19 or 30 of the first two embodiments are replaced by a U-shaped bracket 40 whose spaced sides 41 span the sensor 10 and are bolted to opposite sides of the sensor 10 by bolts 42 which also extend through and mount the pair of leg brackets 17. The leg brackets 17 are identical to those of the other two embodiments. The sides 41 of the bracket 40 are each provided with a slot 43 which receives a respective projecting end 44 of a cross-member 45. The cross-member 45 has a threaded opening which receives an adjustment bolt 46 that extends through an opening (not shown) in the bite 47 of the U-shaped bracket 40. The projecting ends 44 of the cross-member 45 each have a hole which receives one end of an S hook 48. The other end of the hook 48 mounts one end of a respective length of chain 49 or 50. The two lengths of chain 49 and 50 are each connected at their opposite ends to ends of a coil extension spring 51.

It will be appreciated that the bolt 46 can be turned to allow the cross-member 45 to descend towards the sensor 10 while the flexible and resilient strap formed by the chain sections 49 and 50 and the spring 51 are initially assembled to the S hooks 48. Thereafter, the bolt 46 is rotated in an opposite direction to move the cross-member 45 upwardly within the bracket 40 to thereby tighten the strap assembly about the pipe.

Although the mounting assembly has been shown as mounting a sensor block for an ultrasonic flowmeter, the mounting assembly could as well be employed to mount any object to the perimeter of a pipe or other conduit. Also, the pipe need not be circular in cross section since the mounting assembly can accommodate itself to any common shape.

I claim:

1. A mounting assembly for mounting an object to the outer surface of a conduit, comprising:
   bracket means attached to said object, said bracket means including resilient spring legs extending away from opposite sides of the object to engage with and conform to the surface of the conduit; and
   flexible and stretchable strap means for encircling the conduit, said strap means being attached at each end to the bracket means at a position spaced away from the outer surface of the conduit and free of the legs.

2. A mounting assembly in accordance with claim 1 together with a friction pad on each leg and adapted to be in contact with the surface of the conduit.

3. A mounting assembly in accordance with claim 1 wherein said strap means includes a flexible chain and at least one extension spring.

4. A mounting assembly in accordance with claim 3 together with means for shortening the length of said strap means while the strap means is attached to the bracket means.

5. A mounting assembly for mounting an object to the outer surface of a conduit, comprising:
   a pair of brackets attached to opposite sides of said object, said brackets each including a resilient spring leg extending away from the object to engage with and conform to the surface of the conduit; and
   flexible and stretchable strap means for encircling the conduit, said strap means being attached at each end to a respective bracket at a position spaced away from the outer surface of the conduit and free of the leg.

6. A mounting assembly in accordance with claim 5 together with a friction pad on each leg and adapted to be in contact with the surface of the conduit.

7. A mounting assembly in accordance with claim 5 wherein said strap means includes a flexible chain and at least one extension spring.

8. A mounting assembly in accordance with claim 7 wherein said strap means further includes means for shortening the length of said strap means while the strap means is attached to the brackets.

9. A mounting assembly in accordance with claim 8 wherein said shortening means comprises a turnbuckle.

10. A mounting assembly for mounting a sensor against the outer surface of a pipe, comprising:
    a pair of brackets each attached to an opposite side of the sensor,
    said brackets each including a leg portion with a pair of longitudinally spaced resilient spring legs extending away from the sensor and each leg mounting a friction pad adapted to engage the surface of the pipe,
    said brackets each also including an anchor portion spaced above the legs; and
    a flexible and stretchable strap assembly anchored at its ends to the anchor portions of the brackets and adapted to encircle the pipe.

11. A mounting assembly in accordance with claim 10 wherein said strap assembly includes a flexible chain attached at its ends to extension springs which are attached to said anchor portions.

12. A mounting assembly in accordance with claim 10 wherein said strap assembly includes a flexible chain attached at its ends to extension springs that are in turn attached to turnbuckles that are connected to the anchor portions of the brackets.

13. A mounting assembly for mounting an object against the outer surface of a conduit, comprising:
    resilient spring legs attached to opposite sides of an object and extending away from the object to engage with and conform to the surface of the conduit;

flexible and stretchable strap means for encircling the conduit; and bracket means adapted to be attached to the object for enclosing the opposite ends of said strap means, said strap means being attached to the bracket means at a position spaced away from the outer surface of the conduit and free of the legs.

14. A mounting assembly in accordance with claim 13 wherein the bracket means comprises:

a U-shaped bracket with spaced sides adapted to be attached to opposite sides of the object;

a cross-member in the bracket and movable toward and away from the conduit the opposite ends of the strap being attached to the cross member; and a bolt threaded into the cross-member and bearing against the bracket and adapted to move the cross-member toward and away from the conduit.

15. A mounting assembly in accordance with claim 14 wherein said strap means includes a flexible chain and an extension spring.

* * * * *